United States Patent
Bohling et al.

(10) Patent No.: US 9,864,705 B2
(45) Date of Patent: Jan. 9, 2018

(54) DYNAMIC ACCESS METHOD SWITCHING FOR OPEN DATA SETS

(71) Applicant: International Business Machines Corporation, Armonk, NY (US)

(72) Inventors: Neal E. Bohling, San Jose, CA (US); David C. Reed, Tucson, AZ (US); Franklin E. McCune, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 14/929,358

(22) Filed: Nov. 1, 2015

(65) Prior Publication Data
US 2017/0124002 A1    May 4, 2017

(51) Int. Cl.
*G06F 12/14* (2006.01)

(52) U.S. Cl.
CPC .......... *G06F 12/145* (2013.01); *G06F 12/14* (2013.01); *G06F 2212/1052* (2013.01)

(58) Field of Classification Search
CPC . G06F 12/14; G06F 2212/1052; G06F 12/145
See application file for complete search history.

(56) References Cited

U.S. PATENT DOCUMENTS

| | | | |
|---|---|---|---|
| 5,355,477 A | 10/1994 | Strickland et al. | |
| 6,735,676 B1 * | 5/2004 | Kanda | G06F 11/1456 711/147 |
| 7,260,575 B2 | 8/2007 | Dearing et al. | |
| 7,440,936 B2 | 10/2008 | Mori | |
| 7,987,466 B2 | 7/2011 | Nagamatsu | |
| 8,055,613 B1 | 11/2011 | Mu | |
| 2003/0217078 A1 | 11/2003 | Carlson | |
| 2004/0133718 A1 | 7/2004 | Kodama | |
| 2012/0304185 A1 | 11/2012 | Horikawa | |
| 2013/0227215 A1 * | 8/2013 | Lee | G06F 3/061 711/113 |
| 2014/0176586 A1 | 6/2014 | Gruber | |
| 2017/0075573 A1 | 3/2017 | Carpenter | |

OTHER PUBLICATIONS

IBM, Base VSAM and RLS VSAM Smart Swap, Nov. 24, 2009, IP.com, Prior Art Database.
Lovelace, VSAM Demystified, Mar. 2013, IBM Redbooks.
Morse, IAM: Improving Performance for Transaction and Batch VSAM Applications, Feb. 6, 2013, Innovation Data Processing, SHARE 2013.

* cited by examiner

*Primary Examiner* — David X Yi
*Assistant Examiner* — Zubair Ahmed
(74) *Attorney, Agent, or Firm* — Nelson and Nelson; Daniel P. Nelson; Alexis V. Nelson (57) ABSTRACT

A method for switching between access methods while a data set is open includes attempting, on behalf of a first system, to gain access to a data set. The method further determines whether the data set is already open by a second system. In the event the data set is already open, the method uses a first access method to access the data set. In the event the data set is not already open, the method uses a second access method to access the data set. In certain embodiments, the first access method is an RLS (Record Level Sharing) access method and the second access method is a base VSAM (Virtual Storage Access Method) access method. A corresponding system and computer program product are also disclosed.

17 Claims, 7 Drawing Sheets

DYNAMIC ACCESS METHOD SWITCHING FOR OPEN DATA SETS

BACKGROUND

Field of the Invention

This invention relates to systems and methods for switching between access methods for open data sets.

Background of the Invention

In the z/OS operating system, VSAM (Virtual Storage Access Method) describes an access method as well as various structures for organizing data. VSAM currently includes four data set organizations, namely key-sequenced data sets, relative record data sets, entry-sequenced data sets, and linear data sets. The first three of these data sets contain records that can be of either fixed or variable length. These records may be organized in fixed-size blocks referred to as control intervals (CIs), and then into larger divisions referred to as control areas (CAs).

Currently, requests to access data from a VSAM data set are processed using a base VSAM access method, which uses one of several buffering mechanisms, or a Record Level Sharing (RLS) access method, which operates separately with it's own buffering and caching mechanism. Each access method has its strengths and weaknesses, and only one can be used at any given time to access a data set. To switch between access methods, a user typically must CLOSE the data set and OPEN the data set using another access method. Unfortunately, several different applications or systems may be accessing a data at the same time, which makes closing the data set difficult and/or inefficient. The result is that some applications or systems may be accessing the data set using an access method that is sub-optimal. Although some third-party products have functionality to tune performance within a single access method, these products typically don't have the ability to switch between different access methods when data sets are open.

In view of the foregoing, what are needed are systems and methods to switch between access methods when data sets are open. Ideally, such systems and methods will perform such switching without requiring the data sets to be closed and re-opened. Further needed are systems and methods that always or frequently enable a most efficient/optimal access method to be used when accessing VSAM data sets.

SUMMARY

The invention has been developed in response to the present state of the art and, in particular, in response to the problems and needs in the art that have not yet been fully solved by currently available systems and methods. Accordingly, the invention has been developed to provide systems and methods to switch between access methods while a data set is open. The features and advantages of the invention will become more fully apparent from the following description and appended claims, or may be learned by practice of the invention as set forth hereinafter.

Consistent with the foregoing, a method for switching between access methods while a data set is open is disclosed herein. In one embodiment, such a method includes attempting, on behalf of a first system, to gain access to a data set. The method further determines whether the data set is already open by a second system. In the event the data set is already open, the method uses a first access method to access the data set. In the event the data set is not already open, the method uses a second access method to access the data set. In certain embodiments, the first access method is an RLS (Record Level Sharing) access method and the second access method is a base VSAM (Virtual Storage Access Method) access method.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Figure 1:
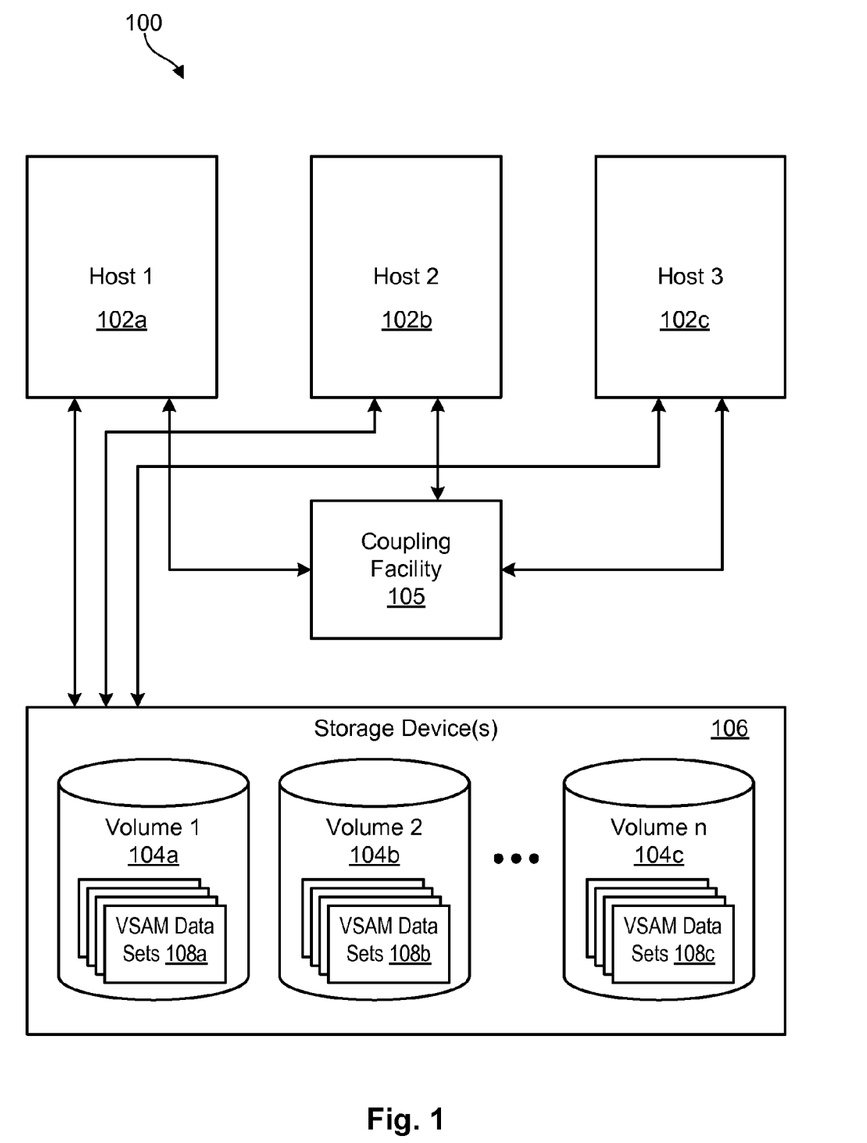
FIG. 1 is a high-level block diagram showing one example of an environment in which a system and method in accordance with the invention may operate.

Referring to FIG. 1, one embodiment of an environment 100 for implementing a system and method in accordance with the invention is illustrated. In the illustrated embodiment, the environment 100 is an IBM Sysplex® environment 100. Nevertheless, embodiments of the invention are not limited to operating within an IBM Sysplex® environment 100 but may include any comparable or analogous environment, regardless of the manufacturer, product name, or components or component names associated with the environment. Furthermore, any environment that could benefit from one or more embodiments of the invention is deemed to fall within the scope of the invention. Moreover, systems and methods in accordance with the invention may be used in any environment that exhibits the same issues or problems disclosed herein. Such environments are also deemed to fall within the scope of the present invention. Thus, the Sysplex® environment 100 is presented only by way of example and is not intended to be limiting.

A Sysplex® environment 100 may be configured to enable multiple mainframe processors of host systems 102a-c to act as a single unit and share the same data, while ensuring data integrity, enabling resource sharing, and balancing workloads. For example, the host systems 102a-c may share data stored in one or more storage device (e.g., DASD) volumes 104a-c. A coupling facility 105 may include computer hardware and/or software that enable the host systems 102a-c to share the same data. In certain embodiments, the coupling facility 105 may include cache to store information shared among the attached host systems 102a-c.

As mentioned, the host systems 102a-c may share data stored in one or more volumes 104a-c stored on one or more storage devices 106. The storage devices 106 may include single disk drives or solid state drive s, arrays of disk drives or solid state drives, or other storage devices 106 known to those of skill in the art. The volumes 104a-c may reside on a single storage device 106 or span multiple storage devices 106. In certain embodiments, the data in the volumes 104a-c may be stored in the form of one or more VSAM (Virtual Storage Access Method) data sets 108a-c.

As previously mentioned, in the z/OS operating system, VSAM describes an access method as well as various structures for organizing data. VSAM currently includes four data set organizations, namely key-sequenced data sets, relative record data sets, entry-sequenced data sets, and linear data sets. The first three of these data sets contain records that can be of either fixed or variable length. These records may be organized in fixed-size blocks referred to as control intervals (CIs), and then into larger divisions referred to as control areas (CAs).

Currently, requests to access data from a VSAM data set 108 are processed using a base VSAM access method, which uses one of several buffering mechanisms, or a Record Level Sharing (RLS) access method, which operates separately with it's own buffering and caching mechanism. Each access method has its strengths and weaknesses, and only one can be used at any given time to access a data set. To switch between access methods, a user must typically CLOSE the data set and re-OPEN the data set using another access method. Unfortunately, several different applications or systems 102a-c may be accessing a data set 108 at the same time, which makes closing the data set 108 difficult or inefficient. The result is that some applications or systems 102 may be accessing the data set 108 using an access method that is sub-optimal. Although some third-party products may have functionality to tune performance within a single access method, these products typically don't have the ability to switch between different access methods when data sets 108 are open.

In view of the foregoing, it would be an advance in the art to provide a system and method to switch between access methods when data sets are open. Ideally, such a system and method would enable such switching without requiring the data sets to be closed and re-opened. Further needed is a system and method that enables a most efficient/optimal access method to be used when accessing a VSAM data set. One embodiment of such a system and method is disclosed in FIGS. 2 through 7.

Figure 2:
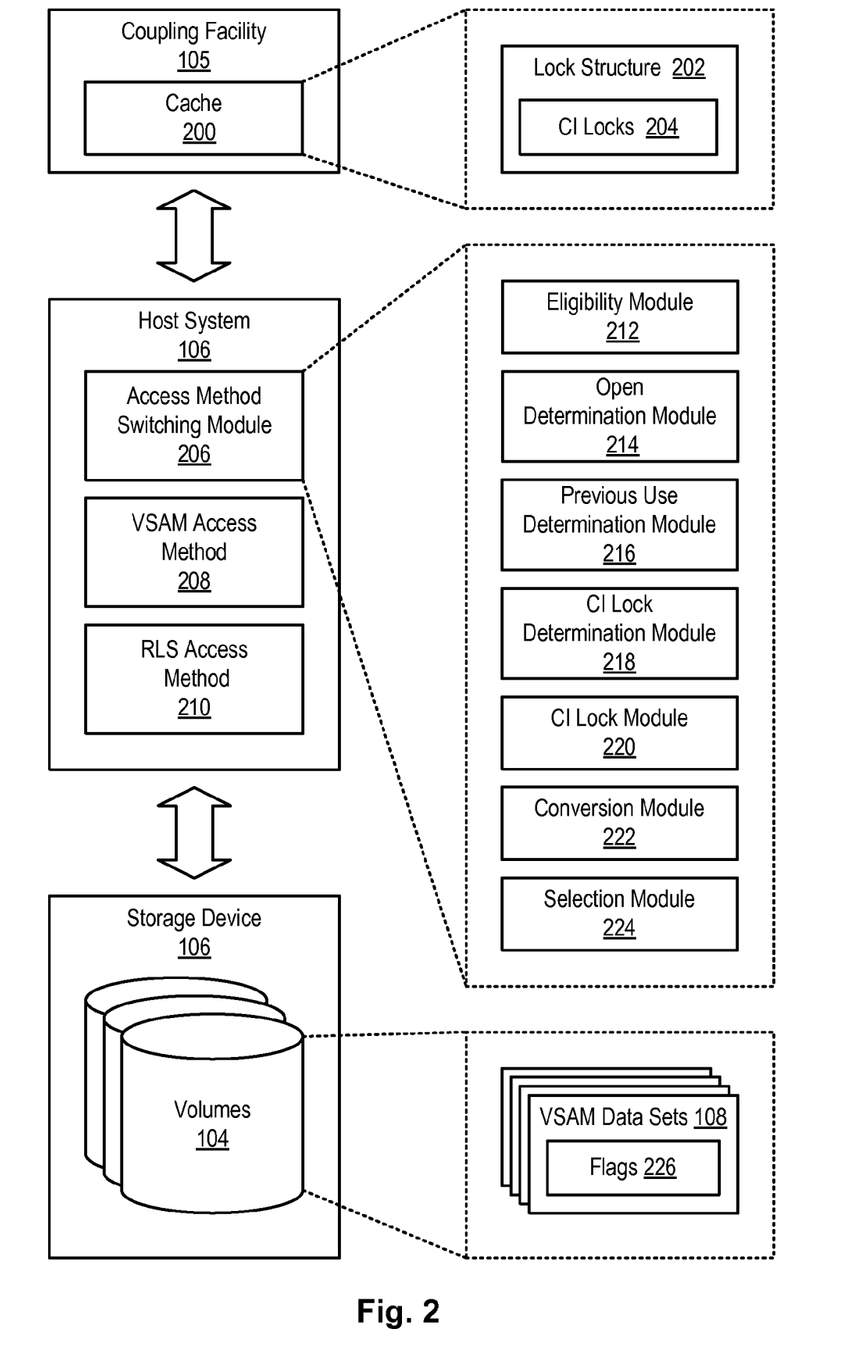
FIG. 2 is a high-level block diagram showing operation of an access method switching module in accordance with the invention.

Referring to FIG. 2, in certain embodiments, an access method switching module 206 in accordance with the invention may be provided to switch between access methods even when data sets 108 are open. For example, the access method switching module 206 may switch between a VSAM access method 208 and an RLS access method 210 depending on which access method would provide the highest expected performance benefit. To provide this functionality, the access method switching module 206 may include one or more sub-modules 212, 214, 216, 218, 220, 222, 224.

The access method switching module 206 may also utilize an additional lock structure 202 in the coupling facility 105 and last-access-mode flags 226 in the VSAM data sets 108 to provide the desired functionality. The lock structure 202 in the cache 200 of the coupling facility 105 may be used to store information about which CI is using which mode (base VSAM or RLS mode). Each lock in the lock structure 202 may represent a single CI and store mode information about the CI. These locks are referred to hereinafter as "CI locks" 204. A last-access-mode flag 226, by contrast, may be stored in the VSAM CI of a data set 108 and may indicate which access method (base VSAM or RLS) was previously used to the access the CI.

As shown, the access method switching module 206 may include one or more of an eligibility module 212, open determination module 214, previous use determination module 216, CI lock determination module 218, CI lock module 220, conversion module 222, and selection module 224. An understanding of the function and flow of the sub-modules 212, 214, 216, 218, 220, 222, 224 may be enhanced by a discussion of the flow diagram illustrated in FIG. 3.

The eligibility module 212 may be configured to determine whether a VSAM data set 108 is eligible to use the RLS access method 210 to access data therein. In certain embodiments, the VSAM data set 108 is only eligible if it is a non-recoverable VSAM data set 108. If the data set 108 is not eligible, then no further analysis is needed to determine whether to switch from a base VSAM access method 208 to the RLS access method 210. If a VSAM data set 108 is eligible to use the RLS access method 210, an open determination module 214 may determine whether the data set 108 is open by any other system or application. If the data set 108 is open by another system or application, additional checks may be required, as will be discussed in association with FIG. 3.

The previous use determination module 216 may be used to determine which access method was previously used to access a control interval (CI) of a VSAM data set 108. The previous use determination module 216 may accomplish this by checking the "last-access mode" flag 226 for the CI in the associated VSAM data set 108. If a CI of a VSAM data set 108 was last accessed by the RLS access method 210, the CI may be accessed using the RLS access method 210 going forward, or until the "last-access mode" flag 226 is reset.

When a system attempts to access a CI of a VSAM data set 108, the CI lock determination module 218 determines whether a lock is held by any other system or application in the coupling facility 105. If a lock 204 is not held by another system or application, the CI lock module 220 may lock the CI on behalf of the requesting system. If a lock 204 is held by another system or application, the conversion module 222 may convert the lock 204 from a base VSAM lock to an RLS lock 204 in the lock structure 202.

Figure 3:
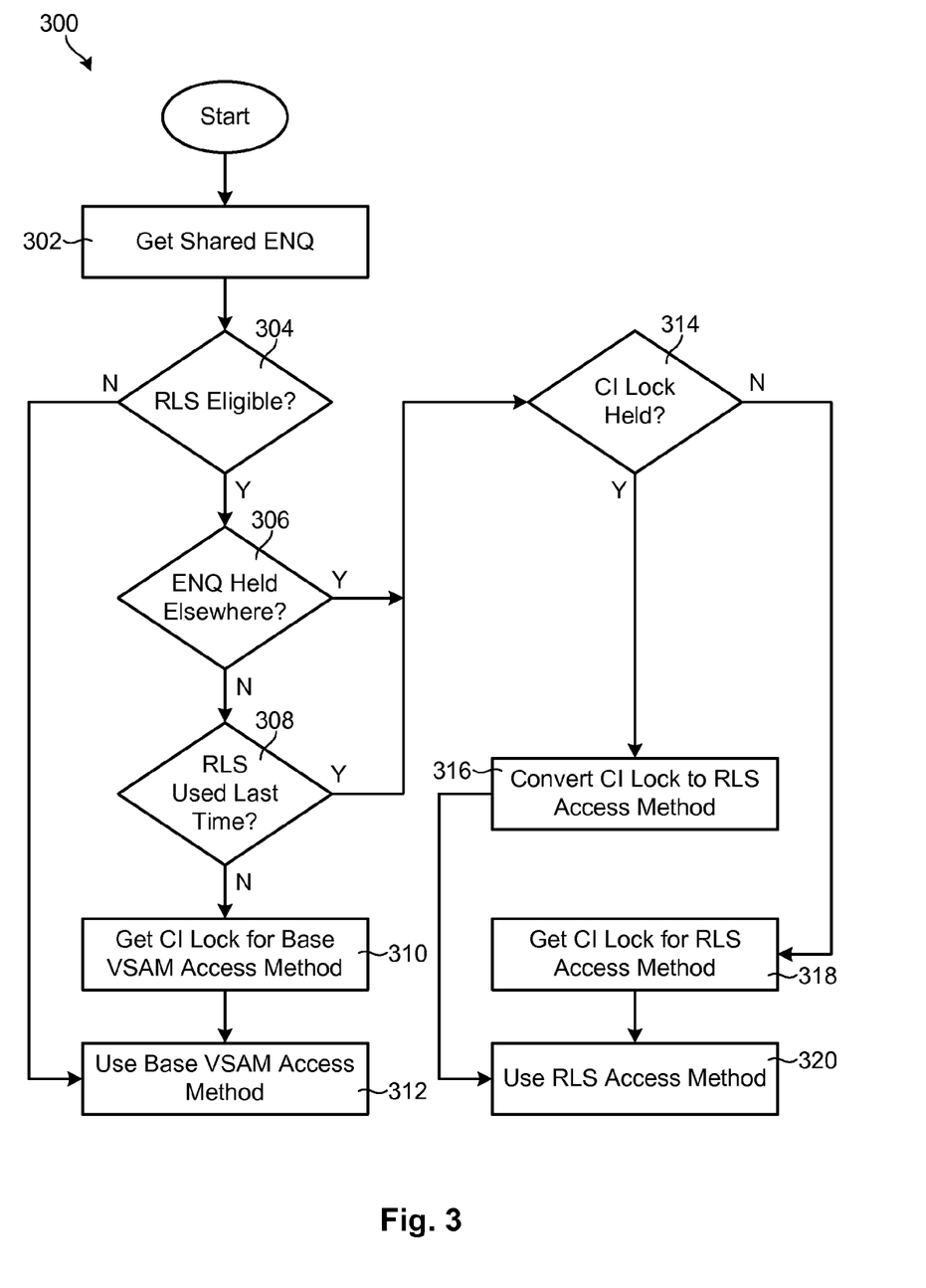
FIG. 3 is a flow diagram showing one embodiment of a method for switching between access methods while a data set is open.

A selection module 224 may ultimately select an access method for a requesting system in accordance with the decision steps described in FIG. 3. If the base VSAM access method 208 is determined to be the most optimal access method under the circumstances, the CI lock module 220 may acquire a CI lock 204 in base VSAM mode and the selection module 224 may select the base VSAM access method 208 to access the CI. If the RLS access method 210 is determined to be the most optimal access method under the circumstances, the CI lock module 220 may acquire a CI lock 204 in RLS mode and the selection module 224 may select the RLS access method 210 to access the CI.

Referring to FIG. 3, one embodiment of a method 300 for switching between access methods while a data set 108 is open, is illustrated. As shown, when a request is received from a system or application to access a CI on a data set 108, the method 300 initially obtains 302 a shared ENQ (an ENQ command is a general-purpose utility for enqueuing requests to a shared resource) to share access to the data set 108. The method 300 then determines 304 whether the data set 108 is RLS eligible. If the data set 108 is not RLS eligible, the method 300 uses 312 the base VSAM access method 208 to access the data set 108 and the method 300 ends.

If, on the other hand, the data set 108 is RLS eligible, the method 300 determines 306 whether an ENQ is held elsewhere, meaning that the method 300 determines whether the data set 108 is open for access by another system or application. If the data set 108 is not open for access by another system or application, the method 300 determines 308 whether the RLS access method 210 was used the last time the particular CI that is subject of the request was accessed. This may be accomplished by checking the last-access-mode flag 226 for the CI. If the last-access-mode flag 226 is not set, meaning that the RLS access method 210 was not the last access method used for the particular CI, then the method 300 obtains 310 a CI lock 204 for the CI in base VSAM mode and uses 312 the base VSAM access method 208 to access the CI.

If, a decision step 306, the method 300 determines 306 that a shared ENQ is held by another application or system (meaning that the data set 108 is open by another system or application), or, at decision step 308, the method 300 determines 308 that the RLS access method 210 was the last access method used to access the CI being requested, the method 300 determines 314 whether a CI lock 204 is held for the CI being requested. If a CI lock 204 is not held, the method 300 obtains 318 a CI lock 204 for the CI in RLS mode and uses 320 the RLS access method 210 to access the CI. If, on the other hand, a CI lock 204 is held by another application or system, the method 300 converts 316 the CI lock 204 already held to RLS mode (if not already in RLS mode or previously converted to RLS mode) and uses 320 the RLS access method 210 to access the CI. The manner in which a CI lock 204 is converted from base VSAM mode to RLS mode will be discussed in association with FIG. 7.

Figure 4:
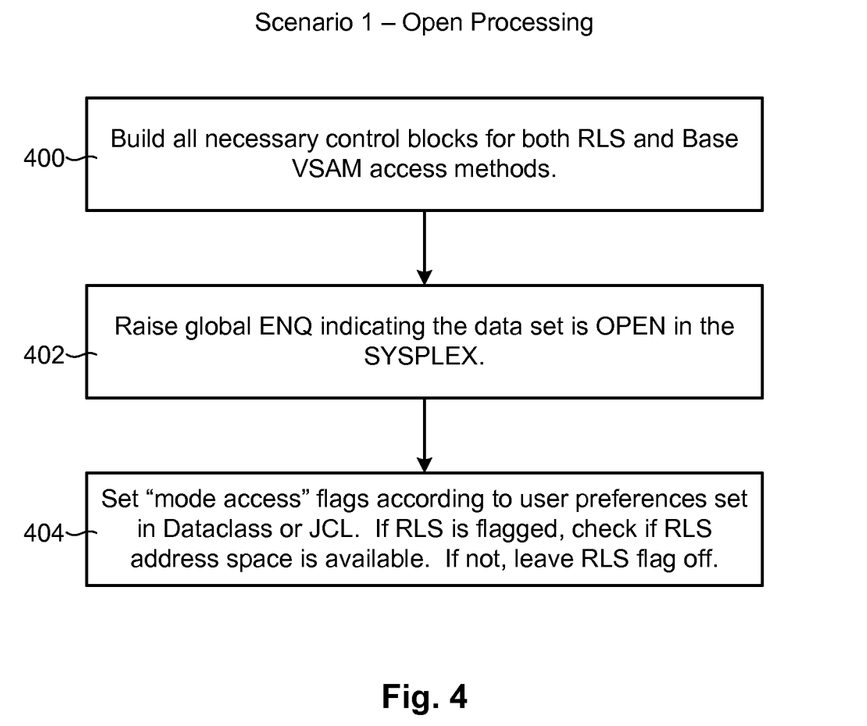
FIG. 4 is a flow diagram showing a first scenario addressed by a system and method in accordance with the invention, namely open processing.

Referring to FIG. 4, a first scenario addressed by a system and method in accordance with the invention, namely open processing, is illustrated. As shown, when a data set 108 is initially opened by a first system 102 (and the data set 108 is not open by any other application or system 102), the system 102 builds 400 all necessary control blocks for both RLS and base VSAM access methods. In essence, this provides a single interface to access both access methods. That is, instead of opening in RLS mode or base VSAM mode, a VSAM data set 108 is instead opened as a VSAM data set 108 with flags indicating which types of requests (base VSAM (NSR, LSR, GSR, etc.) or RLS) will be supported. After all necessary control blocks are built 400, the system 102 raises 402 a global ENQ that indicates that the data set 108 is open in the IBM Sysplex® environment 100. The system 102 may then set 404 "mode access" flags 226 (according to user preferences set in Dataclass or JCL) indicating whether the data set 108 is eligible to be accessed using the RLS access method 210. If the data set 108 is indicated to be RLS eligible, the system 102 may check 404 whether RLS address space is available. If not, the RLS flag 226 may be turned off, indicating that the data set 108 is not RLS eligible.

Figure 5:
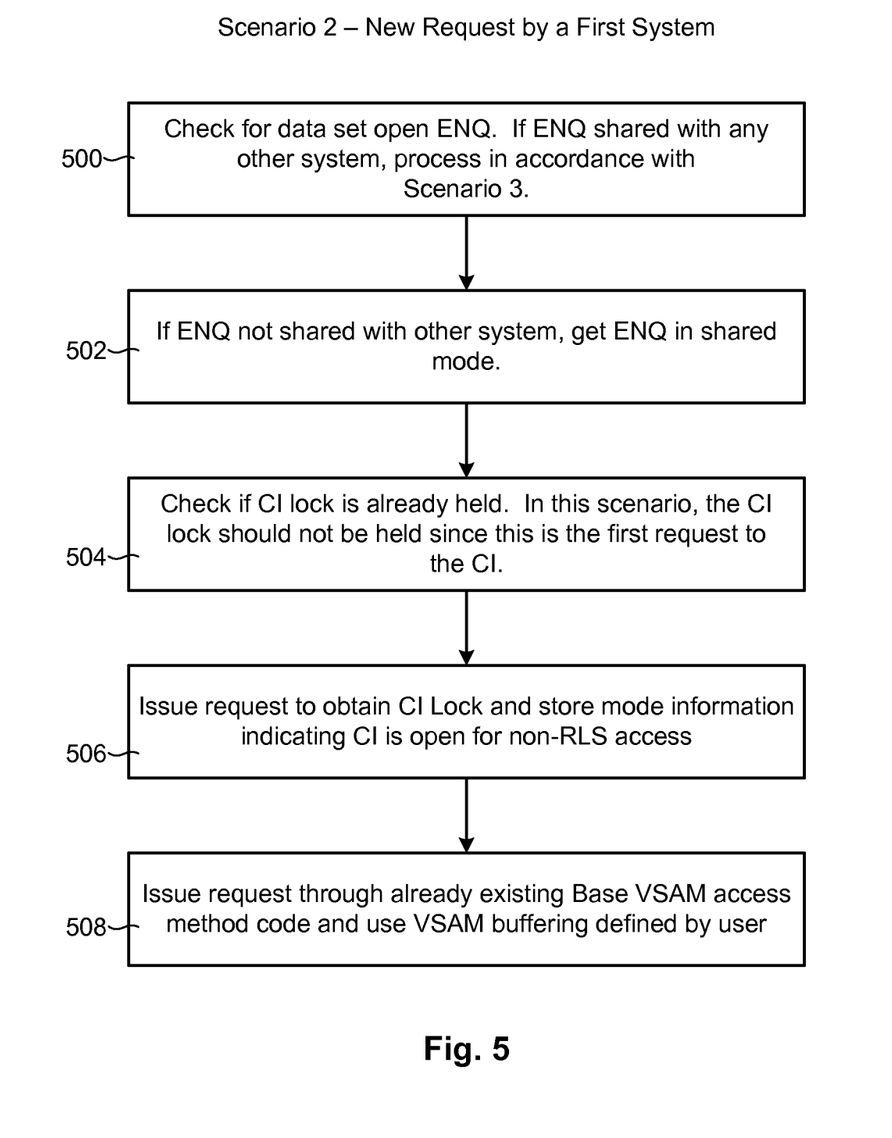
FIG. 5 is a flow diagram showing a second scenario addressed by a system and method in accordance with the invention, namely processing a new request by a first system.

Referring to FIG. 5, a second scenario addressed by a system and method in accordance with the invention, namely processing a new request by a first system 102, is illustrated. As shown, the system 102 checks 500 for a data set open ENQ (determines whether any other system 102 has the data set 108 open). If an ENQ is shared with any other system, the system 102 processes 500 the request in accordance with the scenario illustrated in FIG. 6. If an ENQ is not shared with any other system 102, the first system 102 obtains 502 an ENQ in shared mode. The system 102 then checks 504 if the CI lock 204 is held for the CI being accessed. In this scenario, the CI lock 204 should not be held since this is the first request to the CI. The system 102 then issues 506 a request to obtain a CI lock 204 and stores mode information in the lock structure 202 indicating that the CI is open for non-RLS access, meaning that the base VSAM access method 208 will be used to access the data set 108. The system 102 then issues 508 the request through the base VSAM access method 208 and uses VSAM buffering (as indicated by the NSR, LSR, GSR flags previously discussed) as defined by the user.

Figure 6:
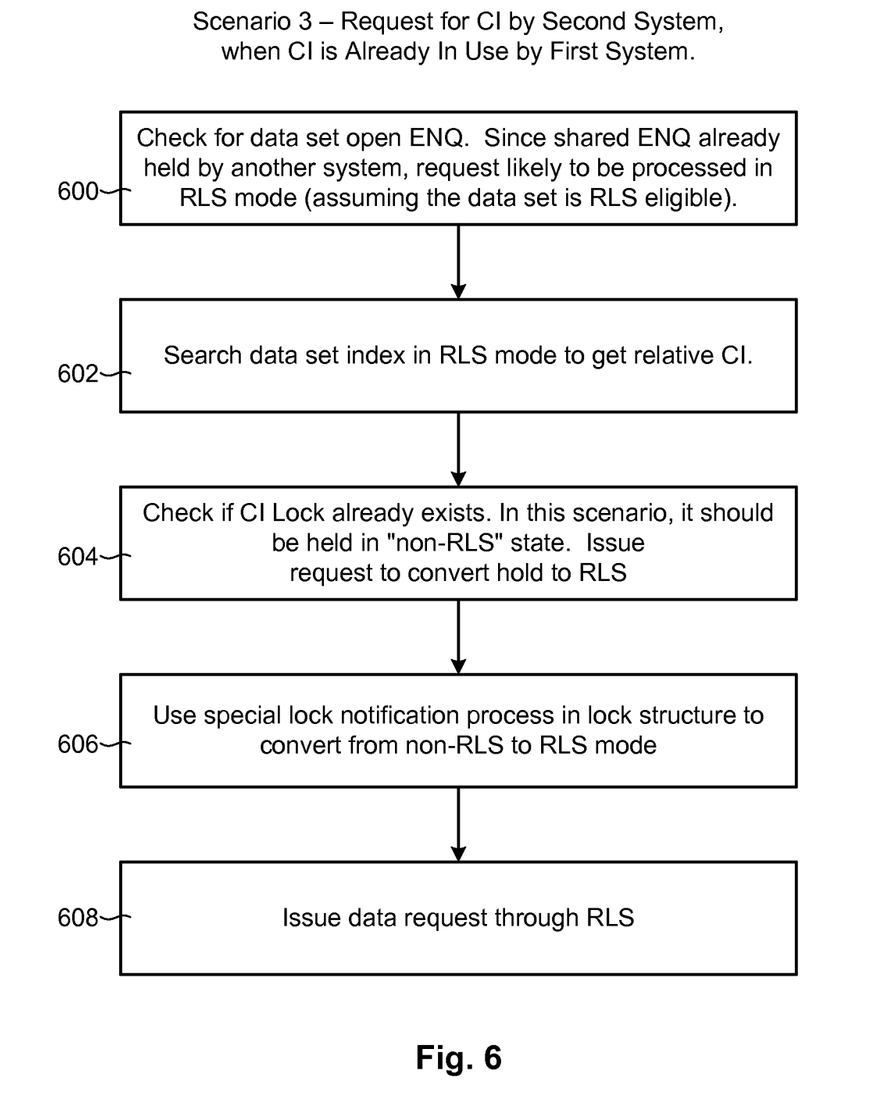
FIG. 6 is a flow diagram showing a third scenario addressed by a system and method in accordance with the invention, namely processing a request for a control interval (CI) by a second system when the CI is already in use by a first system.

Referring to FIG. 6, a third scenario addressed by a system and method in accordance with the invention, namely processing a request for a control interval (CI) by a second system when the CI is already in use by a first system, is illustrated. As shown, a second system 102 initially checks 600 for a data set open ENQ. Since the shared ENQ is already held by the first system 102, the request is likely to be processed in RLS mode. The second system 102 then searches 602 the data set index in RLS mode to get the relative CI to be accessed. The second system 102 then checks 604 whether a CI lock 204 already exists. In this scenario, the CI lock 204 should exist in non-RLS mode since the first system 102 was the first to access the CI (as indicated in scenario 2). The second system 102 then issues 604 a request to convert the CI lock 204 to RLS mode. This initiates 606 a special lock notification process in the lock structure 202 to convert the CI lock 204 from non-RLS to RLS mode. In essence, the lock notification process notifies all systems 102 that have a CI lock 204 that something is changing in association with the CI lock 204, in this case that the CI lock 204 is being changed from non-RLS mode to RLS mode. This will allow any systems 102 that were using base VSAM to convert base VSAM buffers to RLS buffers, thereby allowing the systems 102 to switch the access methods used to access the CI. Once the CI locks 204 are converted to RLS mode, the second system 102 may issue the request using the RLS access method 210.

Figure 7:
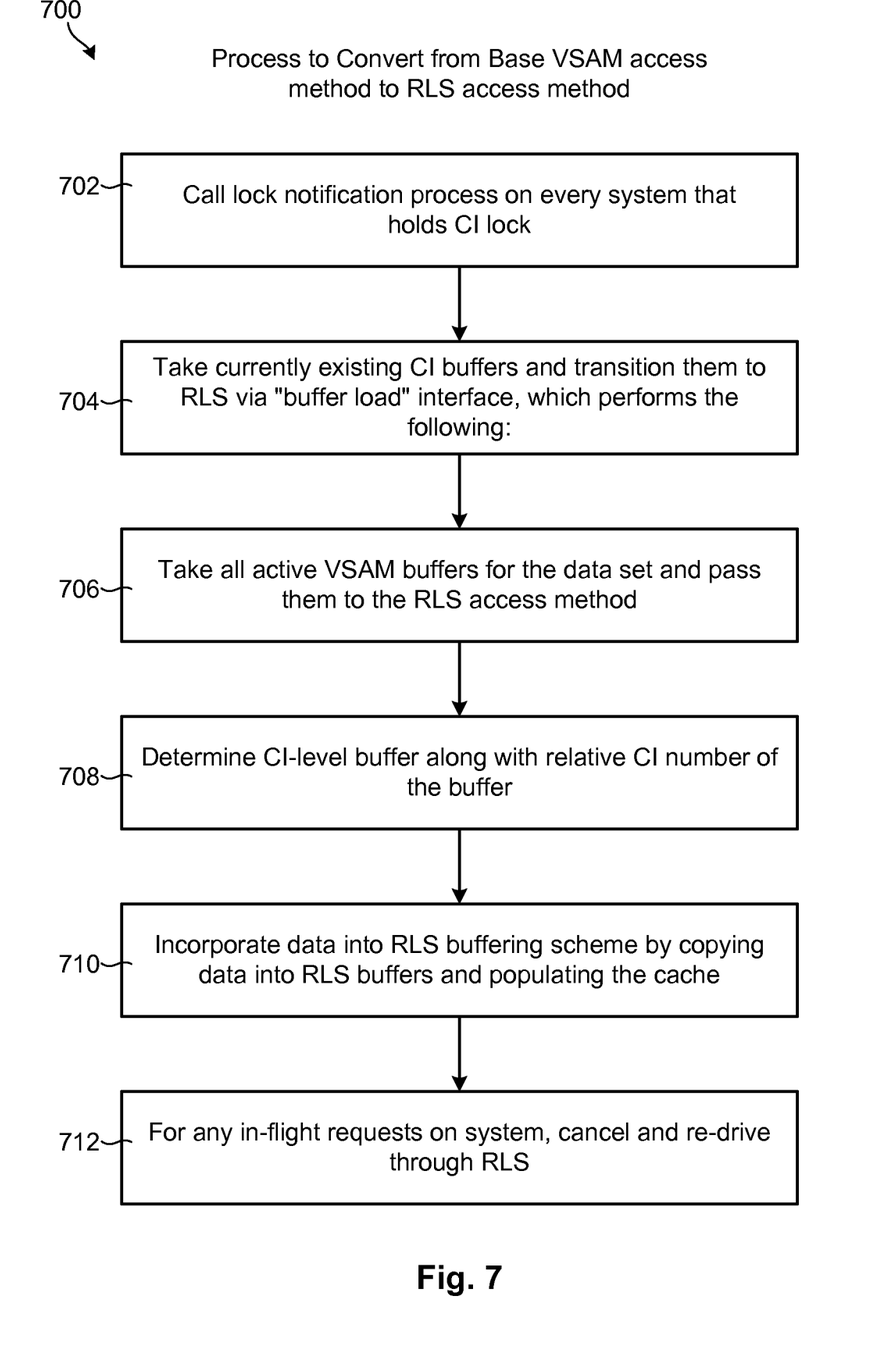
FIG. 7 is a flow diagram showing one embodiment of a method for converting from a base VSAM access method to an RLS access method.

Referring to FIG. 7, one embodiment of a method 700 for converting from use of a base VSAM access method to use of an RLS access method is illustrated. As shown, the method 700 initially calls 702 the aforementioned lock notification process for each system 102 that holds a CI lock 204 for the CI that is the subject of the request. Each system 102 that is notified may take 704 currently existing CI buffers and transition them to RLS via a "buffer load" interface. Specifically, each notified system 102 may take 706 all active VSAM buffers for the data set 108 and pass them to the RLS access method 210. Each notified system may determine 708 the CI-level buffer along with the relative CI number of the buffer and incorporate 710 this data into the RLS buffering scheme by copying data into RLS buffers and populating the cache 200. For any in-flight requests on the notified system 102, these requests may be canceled 712 and re-driven 712 through the RLS access method 210.

Once a CI is flagged as being in RLS mode, the CI may not revert to non-RLS (i.e., base VSAM) mode until the flag is reset by JCL or some other utility. Different types of events may trigger such a reset. For example, closing a data set 108 (i.e., where no systems 102 have the data set 108 open for access) may in certain embodiments trigger a reset of the last-access-mode flags 226 for CIs of the data set 108 (thereby indicating that that the CIs of the data set 108 are in non-RLS mode). When a system 102 opens the data set again, the system 102 would access the data set 108 using the base VSAM access method 208 and transition to the RLS access method 210 if and when conditions warrant. Once in RLS mode, a CI may stay in this mode until the data set 108 is closed or some other event occurs that would warrant changing the mode.

Although particular reference has been made herein to the VSAM access method 306 and the RLS access method 308, the systems and methods disclosed herein may, in certain cases, be equally applicable to other types of access methods. That is, the systems and methods disclosed herein may be used to optimize and switch between other types of access methods, including access methods not specifically addressed herein. Similarly, the systems and methods disclosed herein may be applicable to other types of data sets 302, as opposed to just VSAM data sets 302. That is, the systems and methods disclosed herein may be used to monitor indicators 318 associated with other types of data sets 302 and make recommendations with regard to an optimal access method and/or switch between different access methods.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for switching between access methods while a data set is open, the method comprising:
   sharing, by a first host system and a second host system, access to a data set stored in at least one storage device;
   attempting, on behalf of the first host system, to gain access to a control interval of the data set;
   determining whether the data set is already open by the second host system;
   in the event the data set is already open by the second host system, causing the first host system to use a first access method to access the control interval; and
   in the event the data set is not already open by the second host system and the control interval was not last accessed using the first access method, causing the first host system to use a second access method to access the control interval.

2. The method of claim 1, wherein the first access method is an RLS (Record Level Sharing) access method.

3. The method of claim 1, wherein the second access method is a base VSAM (Virtual Storage Access Method) access method.

4. The method of claim 1, wherein the data set is a VSAM data set.

5. The method of claim 4, wherein the VSAM data set is a non-recoverable VSAM data set.

6. The method of claim 1, wherein using the first access method comprises using the first access method only if the data set is marked as eligible to use the first access method.

7. A computer program product for switching between access methods while a data set is open, the computer program product comprising a computer-readable medium having computer-usable program code embodied therein, the computer-usable program code configured to perform the following when executed by at least one processor:
   share, by a first host system and a second host system, access to a data set stored in at least one storage device;
   attempt, on behalf of the first host system, to gain access to a control interval of the data set;
   determine whether the data set is already open by the second host system;
   in the event the data set is already open by the second host system, cause the first host system to use a first access method to access the control interval; and
   in the event the data set is not already open by the second host system and the control interval was not last accessed using the first access method, cause the first host system to use a second access method to access the control interval.

8. The computer program product of claim 7, wherein the first access method is an RLS (Record Level Sharing) access method.

9. The computer program product of claim 7, wherein the second access method is a base VSAM (Virtual Storage Access Method) access method.

10. The computer program product of claim 7, wherein the data set is a VSAM data set.

11. The computer program product of claim 10, wherein the VSAM data set is a non-recoverable VSAM data set.

12. The computer program product of claim 7, wherein using the first access method comprises using the first access method only if the data set is marked as eligible to use the first access method.

13. A system for switching between access methods while a data set is open, the system comprising:
   at least one processor;
   at least one memory device operably coupled to the at least one processor and storing instructions for execution on the at least one processor, the instructions causing the at least one processor to:
      share, by a first host system and a second host system, access to a stored in at least one storage device;
      attempt, on behalf of the first host system, to gain access to a control interval of the data set;
      determine whether the data set is already open by the second host system;
      in the event the data set is already open by the second host system, cause the first host system to use a first access method to access the control interval; and
      in the event the data set is not already open by the second host system and the control interval was not last accessed using the first access method, cause the first host system to use a second access method to access the control interval.

14. The system of claim 13, wherein the first access method is an RLS (Record Level Sharing) access method.

15. The system of claim 13, wherein the second access method is a base VSAM (Virtual Storage Access Method) access method.

16. The system of claim 13, wherein the data set is a non-recoverable VSAM data set.

17. The system of claim 13, wherein using the first access method comprises using the first access method only if the data set is marked as eligible to use the first access method.

* * * * *